US012002343B2

(12) United States Patent
Cowan

(10) Patent No.: US 12,002,343 B2
(45) Date of Patent: *Jun. 4, 2024

(54) METHOD AND APPARATUS TO ALERT ENERGIZATION OF COOKING APPLIANCE SURFACE BURNERS

(71) Applicant: Midea Group Co., Ltd., Foshan (CN)

(72) Inventor: Richard W. Cowan, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,625

(22) Filed: Mar. 13, 2023

(65) Prior Publication Data

US 2023/0215264 A1 Jul. 6, 2023

Related U.S. Application Data

(62) Division of application No. 16/913,173, filed on Jun. 26, 2020, now Pat. No. 11,605,284.

(51) Int. Cl.

*G08B 21/18* (2006.01)
*F24C 3/12* (2006.01)
*F24C 7/08* (2006.01)

(52) U.S. Cl.

CPC .............. *G08B 21/18* (2013.01); *F24C 3/126* (2013.01); *F24C 7/083* (2013.01)

(58) Field of Classification Search

CPC ........... G08B 21/18; F24C 3/126; F24C 7/083
USPC ........................................................ 126/1 R
See application file for complete search history.

(56) References Cited

U.S. PATENT DOCUMENTS

| | | | | |
|---|---|---|---|---|
| 5,771,878 A | | 6/1998 | Lewis | |
| 6,375,150 B1 | | 4/2002 | Aguirre-Esponda | |
| 7,045,748 B2 | * | 5/2006 | Blackson | F24C 15/106 219/446.1 |
| 7,422,010 B2 | | 9/2008 | Gama | |
| 8,008,605 B2 | | 8/2011 | Shukla | |
| 8,783,243 B2 | | 7/2014 | Hodapp et al. | |
| 9,746,186 B2 | | 8/2017 | Moro et al. | |
| 9,791,936 B1 | | 10/2017 | Kovach | |
| 10,452,046 B2 | * | 10/2019 | Wilson | G06F 3/01 |
| 2005/0236391 A1 | * | 10/2005 | Gama | F24C 3/124 219/445.1 |
| 2005/0257785 A1 | * | 11/2005 | Gama | F24C 3/126 126/39 BA |

(Continued)

FOREIGN PATENT DOCUMENTS

CN 104976646 A 10/2015

OTHER PUBLICATIONS

GuardFire, Did You Leave the Stove On? IGuardstove, The Automatic Stove Shut Off Device, www.iguardfire.com, 2014, Retrieved on Feb. 27, 2020.

(Continued)

*Primary Examiner* — Zhen Y Wu
(74) *Attorney, Agent, or Firm* — Gray Ice Higdon

(57) ABSTRACT

A method and apparatus for a cooking appliance having an alert for energization of one or more burners. The cooking appliance may include an ignition enable control. The cooking appliance may include a locked mode and an unlocked mode. The cooking appliance may include one or more alarms to alert the user.

17 Claims, 3 Drawing Sheets

(56) References Cited

U.S. PATENT DOCUMENTS

2009/0241935 A1* 10/2009 Jaaz ........................ F24C 3/126 700/282
2010/0304315 A1 12/2010 Gulkanat
2011/0146650 A1* 6/2011 Karamatic .............. F24C 7/082 126/42
2012/0100492 A1* 4/2012 Hodapp, Jr. ............ F24C 3/126 431/12
2012/0171343 A1* 7/2012 Cadima ................... F24C 7/082 126/39 BA
2012/0325197 A1 12/2012 Legaspi
2013/0056457 A1* 3/2013 Lee ..................... G06F 3/04883 219/620
2013/0265159 A1* 10/2013 Durian .................... F24C 7/082 340/12.5
2013/0314226 A1* 11/2013 Zhang ..................... F24C 7/082 340/539.11
2014/0295357 A1* 10/2014 McAfee ................... H05B 6/12 431/18
2015/0168987 A1 6/2015 O'Keefe
2015/0374163 A1* 12/2015 Spanò ..................... F24C 3/124 99/337
2016/0320068 A1* 11/2016 Koehler .................. F24C 7/086
2016/0374163 A1 12/2016 Jiang et al.
2017/0023255 A1* 1/2017 Bach ........................ F24C 7/086
2017/0023256 A1* 1/2017 Bach ...................... G05B 15/02
2017/0223781 A1* 8/2017 Lee ...................... H05B 6/1209
2018/0084937 A1* 3/2018 Joo .......................... F24C 7/082
2018/0313544 A1* 11/2018 Lee ......................... F24C 7/085
2019/0078781 A1* 3/2019 Moro ...................... F24C 3/126
2019/0178502 A1 6/2019 Babu
2021/0095859 A1* 4/2021 Park ........................ F24C 7/082
2021/0407275 A1 12/2021 Cowan

OTHER PUBLICATIONS

Rogers, Rebecca, Stove Off-Limits, www.thiscaringhome.com, 2015, Retrieved on Feb. 27, 2020.

U.S. Patent and Trademark Office, Office Action issued in U.S. Appl. No. 16/913,173, 32 pages, dated Sep. 30, 2022.

* cited by examiner

METHOD AND APPARATUS TO ALERT ENERGIZATION OF COOKING APPLIANCE SURFACE BURNERS

BACKGROUND

The present embodiments relate to a method and apparatus for a cooking appliance.

Typical burners may be unintentionally energized, for example, by the user, a pet, and/or someone not aware of the action. This may occur even though typical burners may include a two-manual-operation protocol to energize a burner (e.g., pushing and turning of the knob or actuator). Thus, there is a need to alert the user(s) or people in the surrounding area of the fact that one or more burners has been activated or energized (whether e.g., unintentionally and/or intentionally).

SUMMARY

In some embodiments, a residential cooking appliance may include a housing having a cooking surface. In various embodiments, the appliance may include one or more burners disposed on the cooking surface. In some embodiments, the residential cooking appliance may include a housing having a cooking surface. In various embodiments, the residential cooking appliance may include one or more actuators disposed on the housing and capable of operating the one or more burners between energization and de-energization. In addition, in some embodiments, the residential cooking appliance may include a housing having a cooking surface. In some embodiments, the appliance may include one or more alarms. In various embodiments, the cooking appliance may include an ignition enable control. In some embodiments, the appliance may include a controller coupled to the one or more actuators, the one or more alarms, and the ignition enable control. Moreover, in various embodiments, the controller may receive status of the ignition enable control. In some embodiments, the controller may be configured to cause the one or more alarms to alert the user of the energization of the one or more burners by the one or more actuators based upon the received status of the ignition enable control.

In addition, in some embodiments, when the ignition enable control is not actuated prior to the energization of the one or more burners by the one or more actuators may cause the one or more alarms to alert the user. In various embodiments, the controller may be configured to switch the appliance between a locked mode and an unlocked mode in response to user input. In some embodiments, when in the locked mode, the one or more alarms may alert the user regardless of the status of the ignition enable control. In various embodiments, the controller may be configured to, in response to activating the ignition enable control, not deactivate the one or more alarms. Moreover, in some embodiments, when in the unlocked mode, the one or more alarms may alert the user when the ignition enable control is not actuated prior to the energization of the one or more burners by the one or more actuators. In various embodiments, the controller may be configured to, in response to activating the ignition enable control, deactivate the one or more alarms alerting the user. In some embodiments, when in one of the locked mode or unlocked mode, the controller may be configured to, in response to de-energizing of the one or more burners by the one or more actuators in response to user input, deactivate the one or more alarms alerting the user.

In some embodiments, a method of controlling a cooking appliance may include the cooking appliance having a cooking surface with one or more burners and one or more oven compartments. In some embodiments, the method may include providing a locked mode and an unlocked mode, wherein the locked mode deactivates operation of the oven compartment and the unlocked mode activates operation of the oven compartment, and in both the locked mode and the unlocked mode the one or more burners are operable between energization and de-energization. In various embodiments, the method may include in response to unintentional energization of the one or more burners in both the locked mode and the unlocked mode, alerting the user of the energization of the one or more burners.

In addition, in some embodiments, the method may include deactivating the alert to the user. In various embodiments, deactivating the alert may include de-energizing the one or more burners by turning off one or more actuators. In some embodiments, wherein deactivating the alert by turning off one or more actuators occurs when the cooking appliance may be in both the unlocked mode and the locked mode. In various embodiments, wherein deactivating the alert may include selecting an ignition enable control. In some embodiments, wherein deactivating the alert by selecting the ignition enable control may occur only when the cooking appliance is in the unlocked mode and not when in the locked mode.

In some embodiments, a method of controlling a cooking appliance may include one or more actuators controlling one or more burners between an on/off position. In various embodiments, the method may include operating an ignition enable control between an on status and an off status, in response to the on status the user activates the one or more burners to the on position without activating an alarm towards the user to identify an unintentional energization of the one or more burners, and in response to the off status the user activates the alarm when the user activates the one or more burners to the on position.

In addition, in some embodiments, the method may include a time span upon initiating the ignition enable control to the on status for the user to turn on the one or more burners without activating the alarm. In various embodiments, the one or more burners may be at least one of gas and electric. In some embodiments, the method may include deactivating the alarm in response to the user activating the ignition enable control while maintaining the one or more burners in the on position. In various embodiments, the cooking appliance may be operating in an unlocked mode. In some embodiments, the alarm may be at least one of a visual warning and/or acoustic warning.

In various embodiments, a residential cooking appliance may include a housing, a gas burner, a gas valve, an actuator, and alarm, and/or a controller. In some embodiments, the housing may have a cooking surface. In various embodiments, the gas burner may be disposed on the cooking surface. In some embodiments, the gas valve may regulate gas flow to the gas burner. Moreover, in various embodiments, the actuator may be disposed on the housing and coupled to the gas valve, wherein the actuator may be configured to control the gas valve in response to user actuation of the actuator, the actuator movable between a first position that controls the gas valve to de-energize the gas burner and a second position that controls the gas valve to provide gas flow to the gas burner to energize the gas burner. In some embodiments, the appliance may include one or more alarms. In various embodiments, the controller may be coupled to the actuator and the alarm, the controller may be configured to detect an unintentional energization of the gas burner in response to actuation of the actuator to the second position that causes the gas valve to provide gas flow to the gas burner, and in response to the detection, cause the alarm to alert the user of the unintentional energization of the gas burner.

In addition, in some embodiments, the appliance may include an ignition enable control configured to be actuated by the user to enable ignition of the gas burner, wherein the controller is coupled to the ignition enable control and is further configured to ignite the gas burner in response to actuation of the ignition enable control prior to actuation of the actuator, and to detect the unintentional energization of the gas burner in response to actuation of the actuator in an absence of prior actuation of the ignition enable control. In various embodiments, the appliance may include a control lock configured to be actuated by the user to switch the appliance between a locked mode and an unlocked mode, wherein the controller is coupled to the control lock, is configured to switch the appliance between the locked mode and the unlocked mode in response to actuation of the control lock, and is configured to detect the unintentional energization of the gas burner in response to actuation of the actuator when the appliance is in the locked mode.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
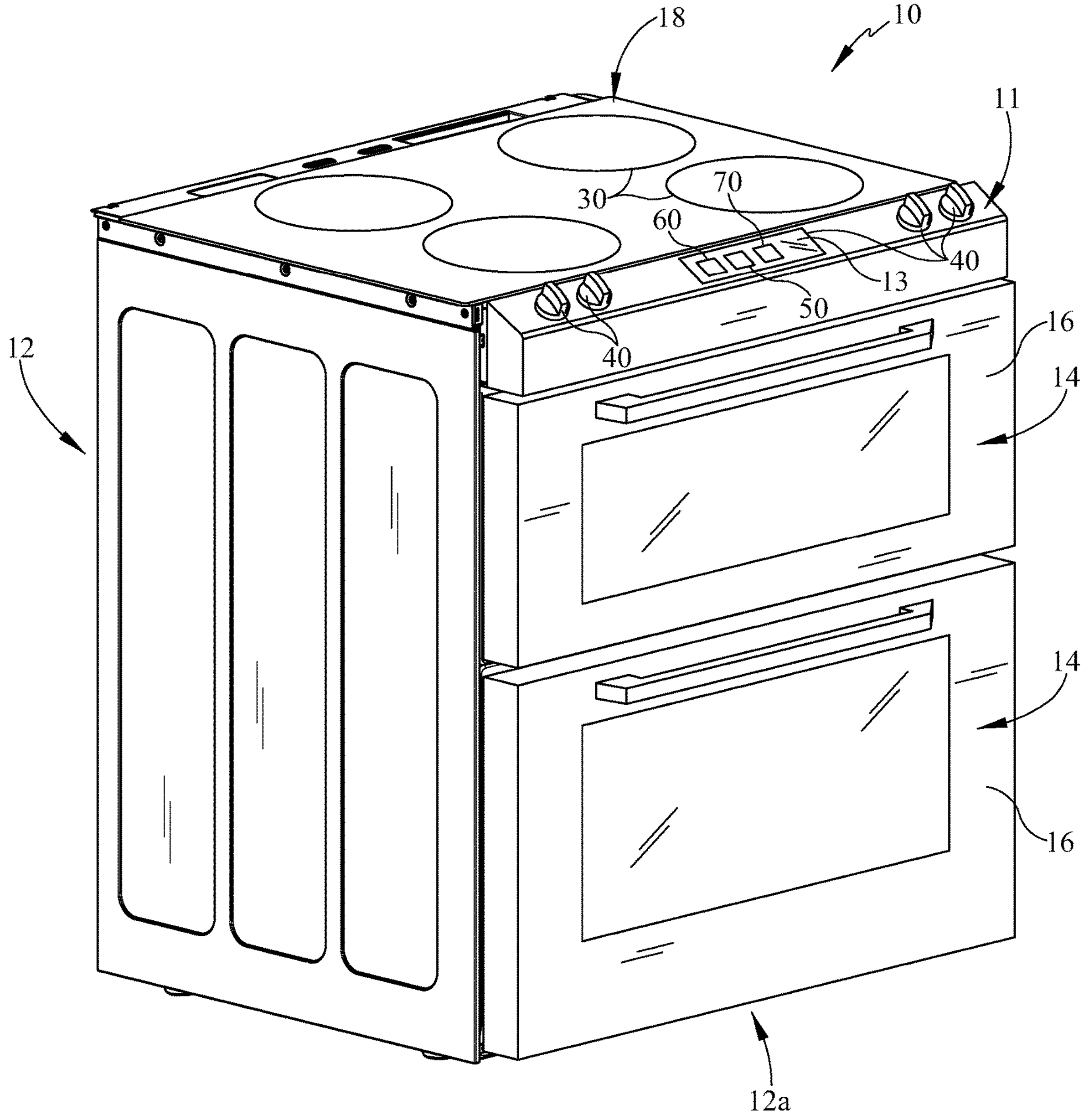
FIG. 1 is a perspective view of one embodiment of a cooking appliance with a cooking surface.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a residential cooking appliance such as cooking appliance 10, such as the type that may be used in single-family or multi-family dwellings, or in other similar applications. However, it will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations. Implementation of the herein-described techniques within gas/electric top burner(s), gas/electric range, slide-in oven, freestanding oven, gas/electric cooktop, gas/electric countertop range, etc. using a gas/electric burner or cooking surface would be well within the abilities of one of ordinary skill in the art having the benefit of the instant disclosure, so the embodiments are not limited to the slide-in oven implementation discussed further herein.

As shown in the Figures, a home cooking appliance 10, such as, but not limited to, a slide-in cooking range, has a housing 12 and a cooking/oven compartment 14, such as a baking oven, convection oven, steam oven, warming drawer and the like, in the housing 12 and accessible through a door or drawer 16 in the front 12*a* of the housing 12. In the embodiment shown, the appliance 10 is an electric range, with a cooking surface 18 having one or more burners 30. Alternatively, the burners 30 may be gas. The one or more gas burners may be disposed on the cooking surface and one or more gas valves may regulate gas flow to the gas burner(s). One or more actuators 40 may be configured to control the gas valve and/or gas burner in response to user actuation of the actuator. The gas valve and/or gas burner may be coupled to the controller 90. The appliance 10 may include a cooking surface 18 on a top of the housing 12. The cooking surface 18 may include one or more cooking grates (not shown) thereon. The cooking grate may support a cooking vessel or cookware (not shown) over one or more burners 30. The appliance 10 may include a control panel or controls 11 having one or more actuators 40 (e.g., mechanical/electrical control knobs or controls) for controlling the burner 30 or gas burner characteristics (e.g., energizing, de-energizing, etc.) and/or cooking compartment 14. The actuators may be a variety of constructions, quantities, shapes, sizes, and positions disposed on the appliance. Alternatively, the actuators or controls may be separate from the housing in some embodiments. The one or more actuators may be energized/activated and/or de-energized/deactivated in a variety of ways. For example, the actuator 40 may utilize two operations to energize the burner.

In some implementations, one or more alarms/alerts 50 may be used to alert that one or more burners 30 have been energized (e.g., unintentionally and/or intentionally activated). This alert or alert condition may occur when the burner 30 energizes (e.g., from off position to an on position). The alarm may be a variety of signals and/or warnings (e.g., audible, visual, lights, display message, user interface, etc., or a combination thereof) directed to one or more users or to an area from one or more devices (e.g., appliances, mobile device, cooking appliance, etc.). The burner 30 may be energized (e.g., heating by electric/gas) concurrently with the alarm(s) 50 alerting or communicating to the user. The alarm 50 may continue until deactivated by the user or an appliance 10/controller 90 parameter/condition is met.

In some implementations, an ignition enable control 60 (e.g., button, knob, interface, etc.) may be used to provide conditions when the alarm 50 is activated and/or deactivated. The ignition enable control 60 may allow one or more burners 30 to be turned to the on position without triggering the one or more alarms 50. For example, the user may engage the ignition enable control 60 and subsequently energize one or more burners 30 without triggering the alarm 50. In some embodiments, a timer or a time span 62 upon activating the ignition enable control 60 may allow the user to turn on one or more burners 30 without an alarm 50. The time span may be a variety of amounts and/or be defined by the user in some embodiments. Upon expiration of the time span (e.g., 15 seconds), if the user attempted to energize another burner 30 along with the previously energized burner or a burner this would cause the alarm to be triggered unless the ignition enable control was activated/actuated. In some embodiments, a timer or time span might not be used. For example, an enabled ignition enable control 60 may be deactivated by turning off the actuator/burner rather than mere lapse of a predetermined time. When the ignition enable control is not activated, energizing (e.g., unintentionally and/or intentionally) the one or more burners would trigger the alarm 50. In some embodiments, when the burner 30 is energized and the alarm 50 has been triggered, the user may deactivate or provide the condition to turn off the alarm. In some embodiments, deactivation of the alarm 50 may be in response to the one or more actuators 40 being turned to the off position. In some embodiments, activating or turning on the ignition enable control 60 may deactivate the alarm. The user may then proceed to use the energized burner(s) 30. Moreover, deactivating the alarm 50 with the ignition enable control 60 may provide for a time span to turn another one or more burners on without triggering the alarm. In some embodiments, the user may be able to deactivate the alarm 50 by either turning off the one or more actuators 40 to the burner(s) 30 or activating the ignition enable control 60. Alternatively or in addition to the herein described actions, a variety of other user actions or appliance conditions may deactivate the alarm.

In some embodiments, the alert could be time delayed by a timer or time span 62 (e.g., one second, two second, etc.) from the time of burner energization to avoid nuisance alarms. For example, the alarm 50 may not be activated when someone (e.g., user) bumps the actuator or knob 40 and the alarm immediately goes back to its off state. Another example might be when someone inadvertently leans against the range and reaches up, pushing and turning the knob or actuator to the on position, but then comes down again and turns the knob back to the off position.

The ignition enable control 60 may be disposed on the appliance 10 (e.g., housing, controls, etc.) in a variety of positions. In some embodiments as shown, the one or more ignition enable controls 60 are separate from or spaced from the one or more actuators 40. Alternatively, one or more actuators 40 (e.g., knobs) may include the ignition enable control.

In some embodiments, the function of the alarm may be disabled and/or ignition enable control may not be used in the appliance. For example, the user may be able to disable the ignition enable control and/or alarm. Therefore, in some embodiments, the user may only be able to turn the actuator or burner knob to the off position to cancel or deactivate the alarm when the ignition enable control is not used or is user disabled.

In some implementations, the cooking appliance 10 may include a control lock feature 70. The control lock or control lock feature 70, if used, may be used with the alarm 50 and/or ignition enable control 60. The control lock feature 70 may be configured between a locked configuration/mode 71 or an unlocked configuration/mode 72. When in the locked configuration 71, the controls associated with the user interface and/or oven controls 11 (e.g., touch pads, buttons, display, etc.), or portions thereof, are locked from the user such that the oven compartment 14 may not be used. When in the unlocked configuration 72, the oven compartment 14 and oven controls may be able to be used and not be locked out to the user. In both the unlocked and locked configurations, the cooktop burners 30 and corresponding actuators/controls 40 may not be locked out to the user and therefore may be energized (e.g., intentionally and/or unintentionally). When the one or more burners 30 is energized in the locked and/or unlocked configuration, if used, the user may be alerted by one or more of the alarms 50 corresponding to the status of ignition enable control operation 60 and/or burner actuators 40. In some implementations, the alarms 50 may be different for the unlocked mode and/or the locked mode.

A cooking appliance 10 consistent with the invention also generally includes one or more controllers 90 configured to control the cooking elements 30 and otherwise perform cooking operations at the direction of a user. In addition, as will become more apparent below, a controller 90 of a cooking appliance in some embodiments may also be configured to alert (e.g., via one or more alarms 50) the user of energization of the one or more burners 30 in connection with cooking food with the cooking element(s) controlled thereby.

Figure 2:
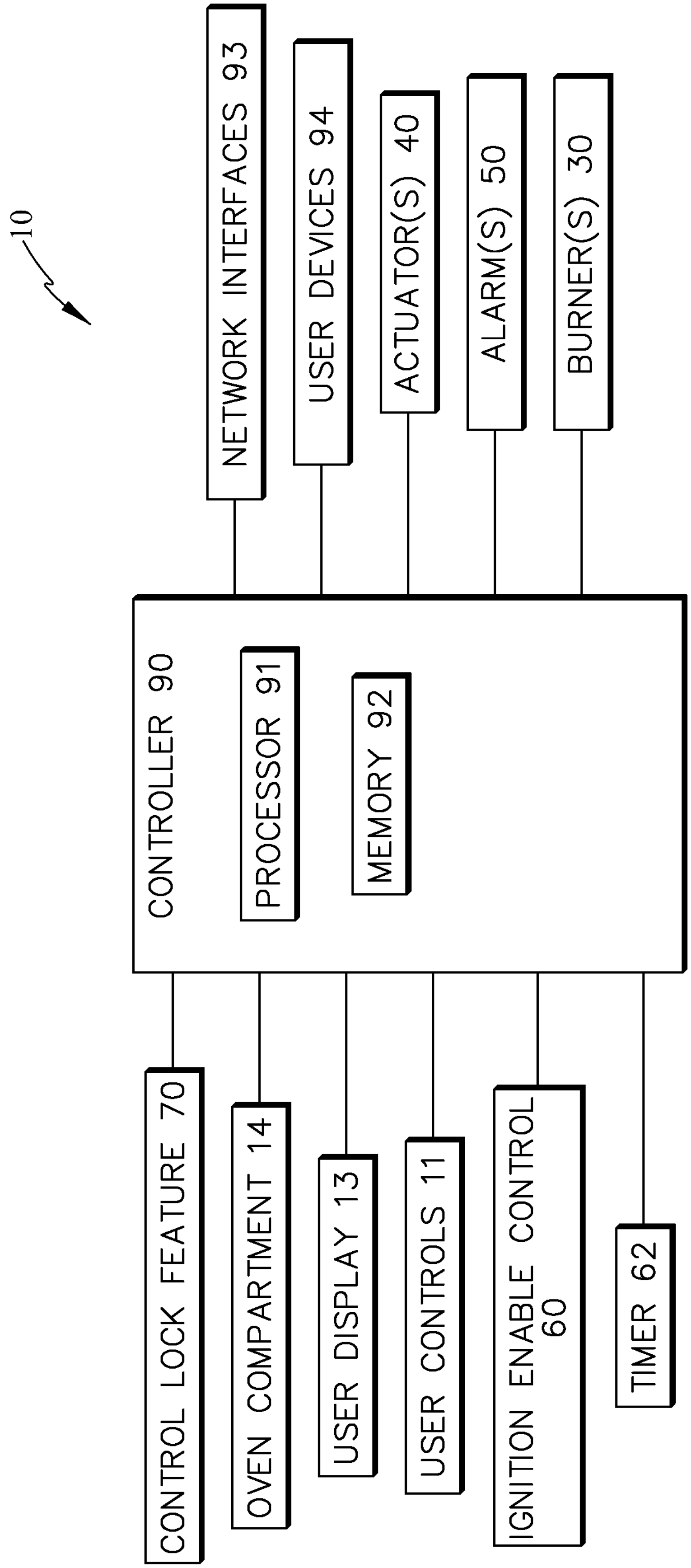
FIG. 2 is a block diagram of an example control system for a cooking appliance consistent with some embodiments of the invention.

FIG. 2 illustrates an example embodiment of a cooking appliance 10 including a controller 90 that receives inputs from a number of components and drives a number of components in response thereto. Cooking appliance 10 may be implemented using practically any type of cooking appliance, e.g., a range, stovetop, single oven, double oven, etc. Controller 90 may, for example, include one or more processors 91 and a memory 92 within which may be stored program code for execution by the one or more processors. The memory may be embedded in controller 90, but may also be considered to include volatile and/or non-volatile memories, cache memories, flash memories, programmable read-only memories, read-only memories, etc., as well as memory storage physically located elsewhere from controller 90, e.g., in a mass storage device or on a remote computer interfaced with controller 90.

As shown in FIG. 2, controller 90 may be interfaced with various components, including various burners 30 used for cooking food (e.g., various combinations of gas, electric, inductive, light, microwave, light cooking elements, among others), one or more user controls 11 for receiving user input (e.g., various combinations of switches, knobs, buttons, sliders, touchscreens or touch-sensitive displays, microphones or audio input devices, image capture devices), actuators 40, alarms 50, control lock feature 70, ignition enable control 60, etc., and a user display 13 (including various indicators, graphical displays, textual displays, speakers, etc.), as well as various additional components suitable for use in a cooking appliance. The user display 13 may include the alarms 50, control lock feature 70, and/or ignition enable control 60 in some embodiments.

Controller 90 may also be interfaced with various alarms 50 located to sense energization/de-energization conditions inside of and/or external to cooking appliance 10, e.g., light, audible/acoustic, visual, etc. Such alarms 50 may be internal or external to cooking appliance 10, and may be coupled wirelessly to controller 90 in some embodiments.

In some embodiments, controller 90 may also be coupled to one or more network interfaces 93, e.g., for interfacing with external devices via wired and/or wireless networks such as Ethernet, Wi-Fi, Bluetooth, NFC, cellular, and other suitable networks. Network may incorporate in some embodiments a home automation network, and various communication protocols may be supported, including various types of home automation communication protocols. In other embodiments, other wireless protocols, e.g., Wi-Fi or Bluetooth, may be used.

In some embodiments, cooking appliance 10 may be interfaced with one or more user devices 94 over the network, e.g., computers, tablets, smart phones, wearable devices, etc., and through which cooking appliance 10 may be controlled and/or cooking appliance 10 may provide user feedback. A user device 94, for example, may be configured to perform various operations with the alarms, e.g., create alarms, modify time spans, activation input, deactivation input, ignition enable control, locked/unlocked configurations, burner energization, burner de-energization, etc.

In some embodiments, controller 90 may operate under the control of an operating system and may execute or otherwise rely upon various computer software applications, components, programs, objects, modules, data structures, etc. In addition, controller 90 may also incorporate hardware logic to implement some or all of the functionality disclosed herein. Further, in some embodiments, the sequences of operations performed by controller 90 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-3 will be apparent to one of ordinary skill in the art, as will become apparent from the description below. Therefore, the invention is not limited to the specific implementations discussed herein.

Figure 3:
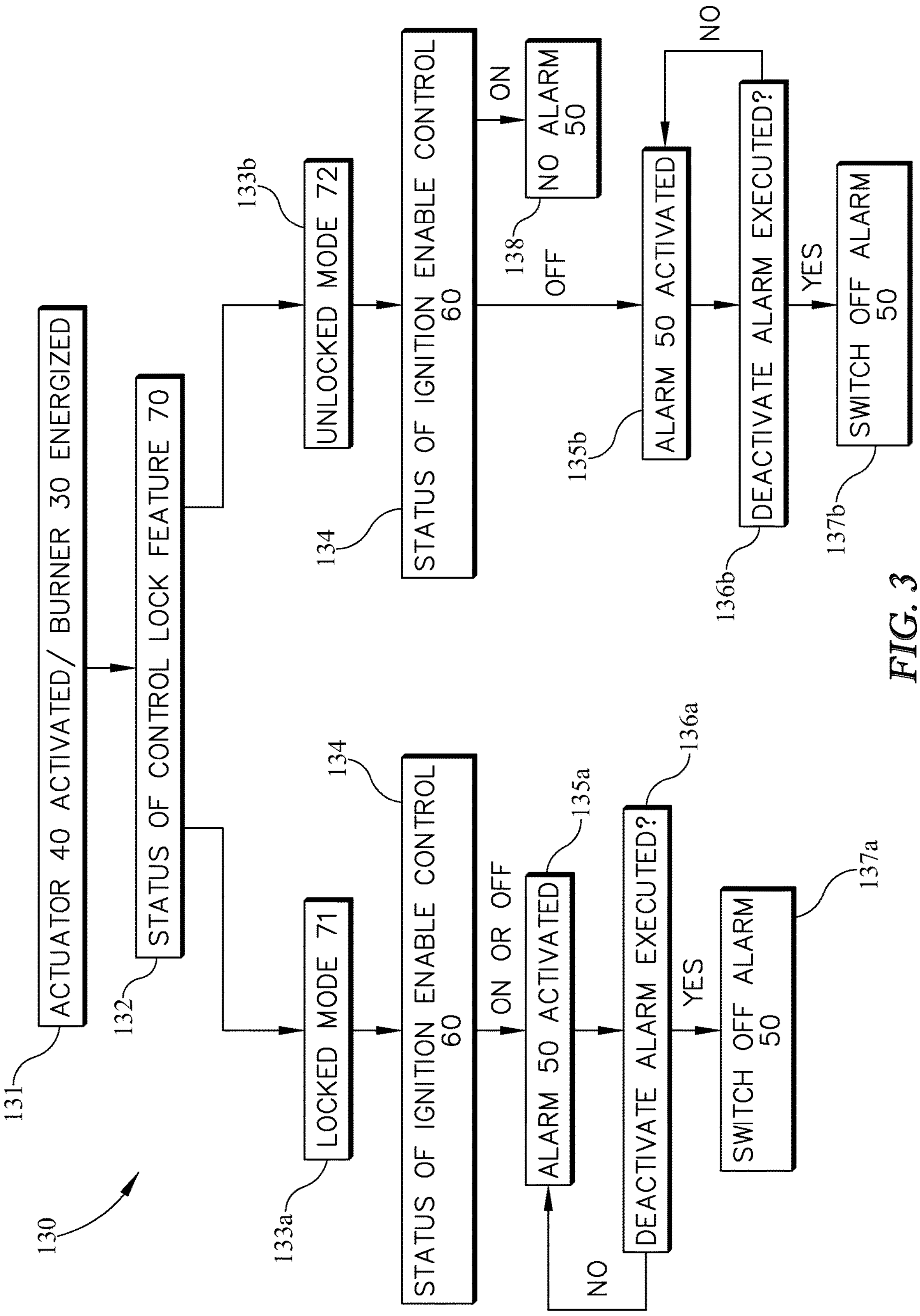
FIG. 3 is a flowchart illustrating an example sequence of operations for alerting the user of burner energization.

Now turning to FIG. 3, various sequences of operations are illustrated for alerting the user of energization of one or more burners using one or more alarms such as cooking appliance 10, e.g., executed on controller 90 and/or a user device coupled thereto. The actuator actuation 40 may be intentional and/or unintentional. FIG. 3, for example, illustrates a sequence of operations 130 for alerting the user (e.g., one or more alarms 50). Sequence 130 may be called, for example, in response to block 131 user selection/activation of one or more burner actuators 40, push/turning the burner knob, or in another suitable manner whenever a user activates at least one burner 30 (e.g., intentional and/or nonintentional).

Next, in block 132, the status 132 of the control lock feature/mode 70, if used, is verified. If the operation of the cooking appliance is in the locked mode 71 or unlocked mode 72, the sequence of operation may vary the alarm parameters as shown. Alternatively, the alarm parameter (e.g., activation and/or deactivation of the energizing alarm) may be the same. If locked 133*a* or unlocked 133*b*, block 134 next determines the status of the ignition enable control 60, if used.

When the cooking appliance is locked 71, as described above, in some embodiments regardless of the status of the ignition enable control 134, the alarm 50 in block 135*a* would alert the user of the energization of the burner 30. The alarm 50 in block 135*a* will continue to alert, so long as the controller 90 does not detect any deactivating actions by the user (e.g., user interface, etc.), in which case the controller 90 continues monitoring the user control interface. In the embodiment shown, once the alarm 135*a* is triggered, block 135*a* passes control to block 136*a* to monitor the status of deactivating the alarm. In this implementation, when the cooking appliance is in the locked mode the alarm 50 may be deactivated, as in block 137*a*, by turning the corresponding burner actuator 40 to the off position. In some embodiments as shown in FIG. 3, in the locked mode 71, turning off the burner may be the only method to deactivate the alarm/burner. Alternatively, a variety of methods may be used such as the same method when in the unlocked mode for example.

When the cooking appliance is unlocked 72, as described above, in some embodiments the alarm in block 135*b* would alert the user of the energization of the burner when the status of the ignition enable control 134 was not selected or activated, off. If the controller 90 detects the ignition enable control 134, there would be no alarm, as in block 138. In some embodiments, a time span upon controller detection of the ignition enable control 60 would allow the user to energize additional burners if desired without alarm. If and when the time span or timer 62 expires, the controller 90 would continue monitoring energization of the one or more burners 30 and/or the status of the ignition enable control 60. The alarm in block 135*b* will continue to alert, so long as the controller 90 does not detect any deactivating actions determined by the user (e.g., user interface, etc.), in which case the controller continues monitoring the user control interface. In some embodiments, the alarms 50 may be the same or different depending on the control lock feature 70. In the embodiment shown, once the alarm 135*b* is triggered, block 135*b* passes control to block 136*b* to monitor the status of deactivating the alarm. In this implementation, when the cooking appliance is in the unlocked mode the alarm may be deactivated, as in block 137*b*, by turning the burner actuator 40 to the off position and/or enabling the ignition enable control 60. Alternatively, a variety of methods may be used to deactivate the alarm.

It should be understood in some implementations, if no control lock feature 70 was used, blocks 134, 135*b*, 136*b*, 137*b*, and 138 may be used to alert the user depending on the status of the ignition enable control 60.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A residential cooking appliance comprising:

a housing having a cooking surface;

a gas burner disposed on the cooking surface;

a gas valve regulating gas flow to the gas burner;

an actuator disposed on the housing and coupled to the gas valve, wherein the actuator is configured to control the gas valve in response to user actuation of the actuator, the actuator movable between a first position that controls the gas valve to de-energize the gas burner and a second position that controls the gas valve to provide gas flow to the gas burner to energize the gas burner;

an alarm;

an ignition enable control; and a controller coupled to the actuator, the ignition enable control, and the alarm, the controller configured to:

receive status of the ignition enable control;

detect an unintentional energization of the gas burner in response to actuation of the actuator to the second position that causes the gas valve to provide gas flow to the gas burner, and in response to the detection, cause the alarm to alert the user of the unintentional energization of the gas burner;

switch the appliance between a locked mode and an unlocked mode in response to user input, wherein when in the locked mode the alarm alerts the user regardless of the status of the ignition enable control.

2. The appliance of claim 1 wherein the controller is configured to ignite the gas burner in response to actuation of the ignition enable control prior to actuation of the actuator, and to detect the unintentional energization of the gas burner in response to actuation of the actuator in an absence of prior actuation of the ignition enable control.

3. The appliance of claim 1 further comprising a control lock configured to be actuated by the user to switch the appliance between the locked mode and the unlocked mode, wherein the controller is coupled to the control lock, is configured to switch the appliance between the locked mode and the unlocked mode in response to actuation of the control lock, and is configured to detect the unintentional energization of the gas burner in response to actuation of the actuator when the appliance is in the locked mode.

4. The appliance of claim 1 wherein when the ignition enable control is not actuated prior to the energization of the gas burner by the actuator cause the alarm to alert the user.

5. The appliance of claim 1 wherein the controller is configured to, in response to activating the ignition enable control, not deactivate the alarm.

6. The appliance of claim 1 wherein when in the unlocked mode, the alarm alerts the user when the ignition enable control is not actuated prior to the energization of the gas burner by the actuator.

7. The appliance of claim 6 wherein the controller is configured to, in response to activating the ignition enable control, deactivate the alarm alerting the user.

8. The appliance of claim 1 wherein when in one of the locked mode or unlocked mode, the controller is configured to, in response to de-energizing of the gas burner by the actuator.

9. The appliance of claim 1 further comprising one or more oven compartments, wherein the locked mode deactivates operation of the oven compartment and the unlocked mode activates operation of the oven compartment.

10. The appliance of claim 1 wherein the alarm is at least one of a visual warning and/or an acoustic warning.

11. A method of controlling a cooking appliance, the method comprising:

the cooking appliance having a cooking surface with one or more burners;

providing a locked mode and an unlocked mode, and in both the locked mode and the unlocked mode the one or more burners are operable between energization and de-energization;

receiving status of an ignition enable control; and in response to unintentional energization of the one or more burners in both the locked mode and the unlocked mode, alerting the user of the energization of the one or more burners, wherein when in the locked mode, the alarm alerts the user regardless of the status of the ignition enable control, and wherein when in the unlocked mode, the alarm alerts the user when the ignition enable control is not actuated prior to the user energizing the one or more burners.

12. The method of claim 11 further comprising deactivating the alert to the user.

13. The method of claim 12 wherein deactivating the alert includes de-energizing the one or more burners by turning off one or more actuators.

14. The method of claim 13 wherein deactivating the alert by turning off one or more actuators occurs when the cooking appliance is in both the unlocked mode and the locked mode.

15. The method of claim 12 wherein deactivating the alert includes selecting the ignition enable control.

16. The method of claim 15 wherein deactivating the alert by selecting the ignition enable control occurs only when the cooking appliance is in the unlocked mode and not when in the locked mode.

17. The method of claim 11 wherein the cooking appliance includes one or more oven compartments, wherein the locked mode deactivates operation of the oven compartment and the unlocked mode activates operation of the oven compartment.

* * * * *